US008873476B2

(12) United States Patent
Lee et al.

(10) Patent No.: US 8,873,476 B2
(45) Date of Patent: Oct. 28, 2014

(54) METHOD FOR NETWORK ENTRY IN A WIRELESS COMMUNICATION SYSTEM

(75) Inventors: Jin Lee, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 312 days.

(21) Appl. No.: 12/755,866

(22) Filed: Apr. 7, 2010

(65) Prior Publication Data

US 2010/0254336 A1 Oct. 7, 2010

Related U.S. Application Data

(60) Provisional application No. 61/167,494, filed on Apr. 7, 2009, provisional application No. 61/220,585, filed on Jun. 26, 2009.

(30) Foreign Application Priority Data

Nov. 2, 2009 (KR) ........................ 10-2009-0104801

(51) Int. Cl.
*H04W 4/00* (2009.01)
*H04W 74/00* (2009.01)
*H04W 24/00* (2009.01)
*H04W 72/04* (2009.01)

(52) U.S. Cl.
CPC .............. *H04W 74/00* (2013.01); *H04W 24/00* (2013.01); *H04W 72/042* (2013.01)
USPC ........................................ 370/329; 455/552.1

(58) Field of Classification Search
CPC ...... H04W 72/04; H04W 88/08; H04W 76/00
USPC ................. 370/329–331, 311, 338, 208, 328; 455/522, 456.1
See application file for complete search history.

(56) References Cited

U.S. PATENT DOCUMENTS

| 7,620,020 | B2 | 11/2009 | Lim et al. | |
|---|---|---|---|---|
| 7,768,966 | B2 * | 8/2010 | Yoon et al. | ..................... 370/329 |
| 7,773,988 | B2 | 8/2010 | Jung et al. | |
| 2006/0203712 | A1 | 9/2006 | Lim et al. | |

(Continued)

FOREIGN PATENT DOCUMENTS

| CN | 101188865 A | 5/2008 |
|---|---|---|
| CN | 101217780 A | 7/2008 |

(Continued)

OTHER PUBLICATIONS

Okuda et al., "Fast Network Entry Procedure," IEEE 802.16 Broadband Wireless Access Working Group ,http://ieee802.org/16>, IEEE C802.16m-08/964, Sep. 5, 2008, 3 pages.

*Primary Examiner* — Afshawn Towfighi (74) *Attorney, Agent, or Firm* — Birch, Stewart, Kolasch & Birch, LLP (57) ABSTRACT

A method for network entry in a wireless communication system is disclosed. The method includes receiving an Advanced Air Interface Ranging Response (AAI_RNG-RSP) message including an unsolicited bandwidth indicator from a Base Station (BS), the unsolicited bandwidth indicator indicating that the BS will allocate an uplink bandwidth to the MS, for transmission of a Medium Access Control (MAC) message, without solicitation from the MS, and monitoring an Advanced MAP Information Element (A-A-MAP IE) for a predefined time after the reception of the AAI_RNG-REQ message.

8 Claims, 8 Drawing Sheets

(56) References Cited

U.S. PATENT DOCUMENTS

2007/0274265 A1* 11/2007 Yoon et al. .................... 370/335
2008/0151789 A1* 6/2008 Venkatachalam et al. .... 370/280
2008/0240059 A1* 10/2008 Kang ............................ 370/338
2008/0298315 A1 12/2008 Ihm et al.
2009/0067374 A1 3/2009 Yoon et al.
2010/0056202 A1* 3/2010 Li et al. ..................... 455/552.1

FOREIGN PATENT DOCUMENTS

| CN | 101296140 A | 10/2008 |
| JP | 2006-254461 A | 9/2006 |
| KR | 10-2007-0080400 A | 8/2007 |
| KR | 10-2007-0110180 A | 11/2007 |
| WO | WO 2008/044317 A1 | 10/2008 |
| WO | WO 2009/028102 A1 | 3/2009 |

* cited by examiner

METHOD FOR NETWORK ENTRY IN A WIRELESS COMMUNICATION SYSTEM

CROSS-REFERENCE TO RELATED APPLICATIONS

This application claims the benefit of Korean Patent Application No. 10-2009-0104801, filed on Nov. 2, 2009, which is hereby incorporated by reference as if fully set forth herein. This application also claims the benefit of U.S. Provisional Application Ser. No. 61/167,494, filed on Apr. 7, 2009, 61/220,585, filed on Jun. 26, 2009, the content of which is hereby incorporated by reference herein in their entirety.

BACKGROUND OF THE INVENTION

1. Field of the Invention

The present invention relates to a wireless communication system, and more particularly, to a method for network entry in a wireless communication system.

2. Discussion of the Related Art

Figure 1:
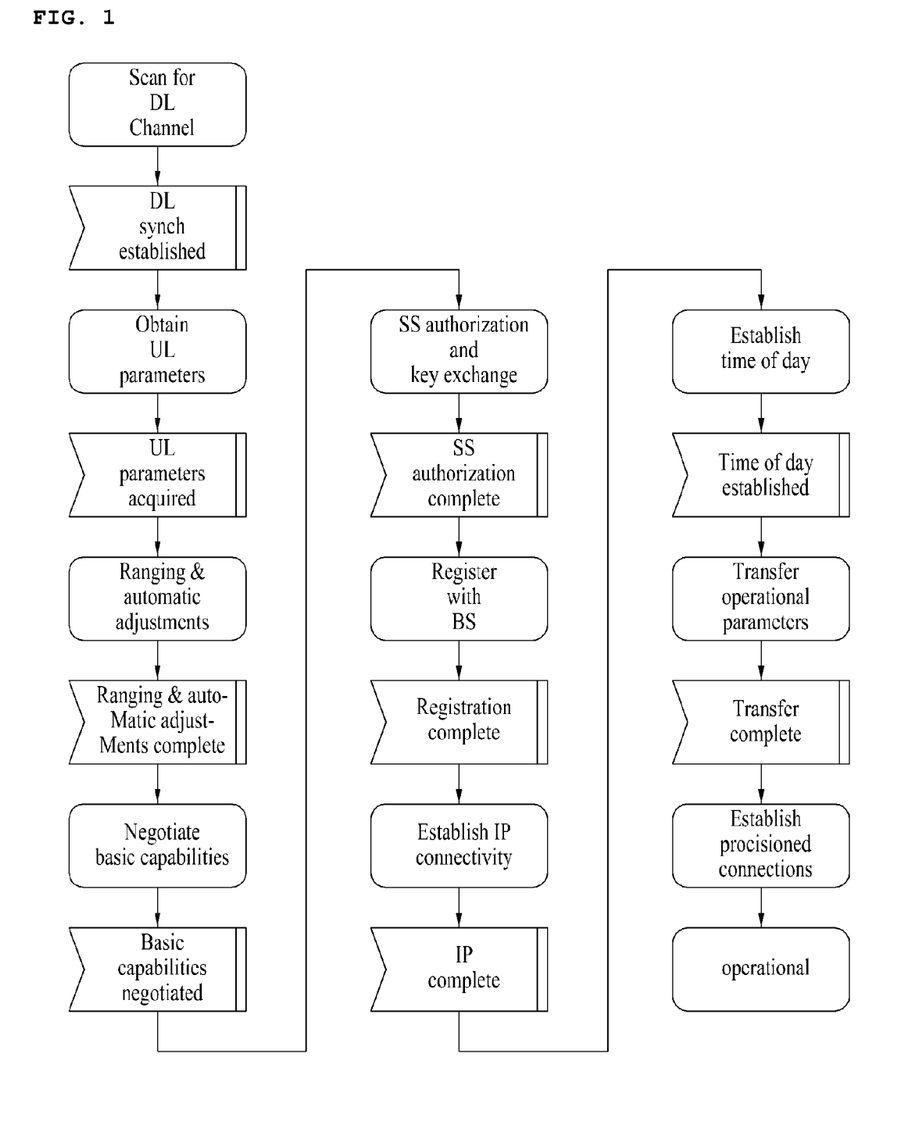
FIG. 1 is a flowchart illustrating a conventional network entry operation in a wireless communication system.

A conventional network entry method in a wireless communication system will be described below with reference to FIGS. 1, 2 and 3. FIG. 1 is a flowchart illustrating a conventional network entry operation in a wireless communication system.

A Subscriber Station (SS) performs network entry, upon power on or when it loses communication with its serving cell or moves into a new cell. The network entry involves 10 steps.

Referring to FIG. 1, for initial access upon power-on, the SS searches for a connectable Base Station (BS) by scanning DownLink (DL) channels. Because the SS has no knowledge of a network topology or configuration at first, the SS scans the frequencies of neighbor BSs one by one.

After the SS finishes all system settings by acquiring DL and UpLink (UL) system information from a detected BS, it performs a ranging procedure with the detected BS. The SS synchronies a UL timing with the BS by contention-based ranging. For the contention-based ranging, the SS randomly selects a Code Division Multiple Access (CDMA) code and transmits the CDMA code to the BS.

Until the synchronization is completed, the BS notifies the SS of parameters to be adjusted by a Ranging Response (RNG-RSP) message. While the parameters are being adjusted, Status is set to "continue" in the RNG-RSP message. After the parameters are completely adjusted, the BS transmits an RNG-RSP message with Status set to "success" to the SS.

The SS negotiates basic capabilities with the BS. If the SS acquires synchronization completely with the BS after authentication, it registers to a broadband network and receives a service from the BS over the broadband network.

During the network entry, the SS and the BS transmit and receive Medium Access Control (MAC) messages such as Advanced Air Interface Ranging Request/Response (AAI_RNG-REQ/RSP), AAI SS Basic Capability Request/Response (AAI_SBC-REQ/RSP), AAI Privacy Key Management Request/Response (AAI_PKM-REQ/RSP), AAI Registration Request/Response (AAI_REG-REQ/RSP), etc. Conventionally, whenever the SS transmits a MAC message, it requests UL resource allocation to the BS in order to transmit the MAC message.

Figure 2:
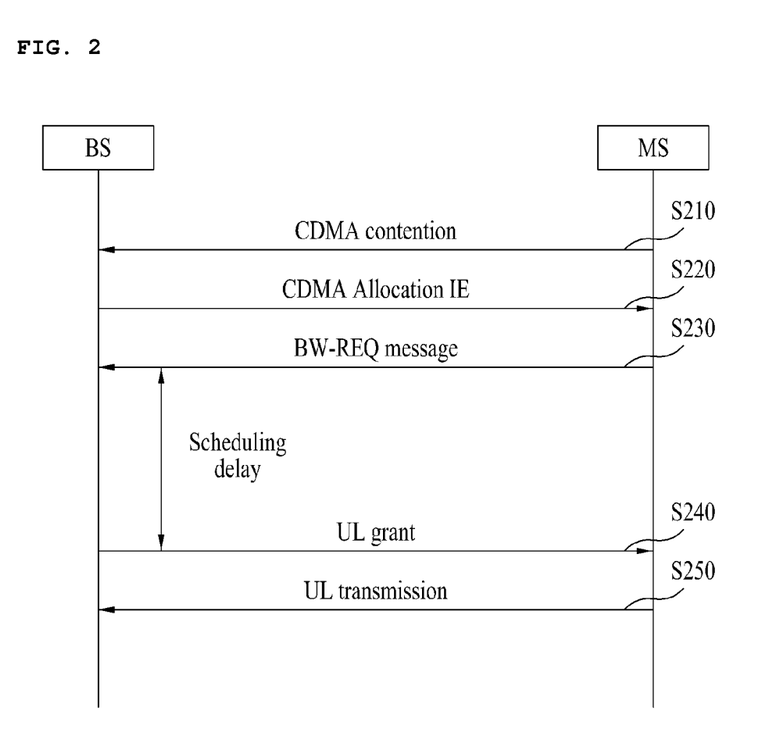
FIG. 2 is a diagram illustrating a signal flow for a Bandwidth Request (BR) operation of a Mobile Station (MS) in a conventional wireless communication system.
Figure 3:
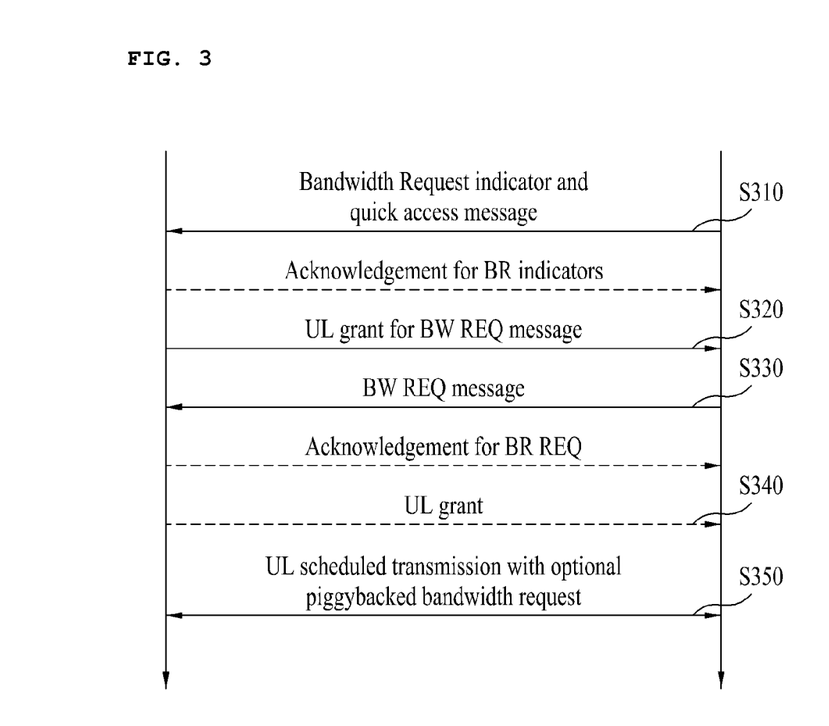
FIG. 3 is a diagram illustrating a signal flow for a BR operation of an MS in a future wireless communication system.

FIG. 2 is a diagram illustrating a signal flow for a Bandwidth Request (BR) operation of a Mobile Station (MS) in a conventional wireless communication system, and FIG. 3 is a diagram illustrating a signal flow for a BR operation of an MS in a future wireless communication system.

Referring to FIG. 2, an MS selects a code from a set of codes classified as BR codes among ranging codes and transmits the selected code to a BS in order to request a UL bandwidth in step S210. Upon successful receipt of the code from the MS, the BS allocates UL resources to the MS so that the MS may transmit a Bandwidth Request (BW-REQ) message in the allocated UL resources in step S220. In the meantime, after transmitting the code, the MS activates a timer. If the MS fails to receive a UL resource assignment from the BS until the timer expires, it retransmits the code. The timer may be set to a contention-based reservation timeout or a value T3.

In step S230, the MS transmits a BW-REQ message to the BS in the allocated UL resources. Upon receipt of the BW-REQ message from the MS, the BS allocates UL resources to the MS in step S240 and the MS transmits data in the allocated UL resources to the BS in step S250.

In the future-generation wireless communication system, a BS supports both a 5-step regular BR procedure and a 3-step quick access BR procedure. The 5-step regular BR procedure may be performed independently of the 3-step quick access BR procedure or as a fallback mode of the 3-step quick access BR procedure.

Referring to FIG. 3, in the 3-step quick access BR procedure, the MS transmits a BR indicator that is randomly selected or selected according to a predetermined rule and a quick access message to the BS in step S310. The BR indicator may be a BR sequence or a BR code, and the quick access message carries UL BR information such as a Station Identifier (STID), a request size, etc. The BS may transmit an ACKnowledgment (ACK) for the received BR indicator to the MS.

Upon successful receipt of the BR indicator and the quick access message, the BS allocates UL resources to the MS by a UL basic assignment Advanced-MAP (A-MAP) Information Element (IE) in step S340 and the MS transmits data in allocated UL resources to the BS in step S350. The MS may piggyback additional UL BR information along with the data in step S350.

In the 5-step regular BR procedure, the MS transmits a randomly selected BR indicator in step S310. Upon successful receipt of the BR indicator, the BS allocates UL resources to the MS by a CDMA allocation A-MAP IE so that the MS may transmit a BW-REQ message in the allocated UL resources in step S320. In step S330, the MS transmits BW-REQ message in the allocated UL resources to the BS. The BS then allocates UL resources to the MS by a UL basic assignment A-MAP IE in step S340 and the MS transmits data in the allocated UL resources in step S350. The MS may piggyback additional UL BR information along with the data in step S350.

Conventionally, each time an MS is to transmit a MAC message during network entry, the MS requests UL resource allocation to a BS, for transmission of the MAC message. As a consequence, the network entry is delayed.

SUMMARY OF THE INVENTION

As described above, conventionally, each time a Mobile Station (MS) is to transmit a Medium Access Control (MAC) message during network entry, the MS requests UpLink (UL) resource allocation to a Base Station (BS), for transmission of the MAC message. As a consequence, the network entry is delayed.

Accordingly, the present invention is directed to a method for network entry in a wireless communication system that substantially obviates one or more problems due to limitations and disadvantages of the related art.

An object of the present invention is to provide a network entry method for preventing delay.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for network entry at an MS in a wireless communication system includes receiving an Advanced Air Interface Ranging Response (AAI_RNG-RSP) message including an unsolicited bandwidth indicator from a BS, the unsolicited bandwidth indicator indicating that the BS will allocate an uplink bandwidth to the MS, for transmission of a Medium Access Control (MAC) message, without solicitation from the MS, and monitoring an Advanced MAP Information Element (A-A-MAP IE) for a predefined time after the reception of the AAI_RNG-REQ message.

The MS may be allocated an uplink bandwidth within the predefined time after the reception of the AAI_RNG-RSP message, and transmit a MAC message in the allocated uplink bandwidth to the BS.

The MS may receive a Negative Acknowledgment (NACK) signal for the MAC message, be allocated an uplink bandwidth within the predefined time after the reception of the NACK signal, and retransmit the MAC message in the allocated uplink bandwidth to the BS.

If the allocated uplink bandwidth is not sufficient for transmission of the MAC message, the MS may request an additional uplink bandwidth, while transmitting part of the MAC message in the allocated uplink bandwidth.

If an uplink bandwidth is not allocated to the MS within the predefined time, the MS may perform a contention-based bandwidth request.

In another aspect of the present invention, a method for supporting network entry at a BS in a wireless communication system includes transmitting an AAI_RNG-RSP message including an unsolicited bandwidth indicator to an MS, the unsolicited bandwidth indicator indicating that the BS will allocate an uplink bandwidth to the MS, for transmission of a MAC message, without solicitation from the MS, and allocating an uplink bandwidth to the MS within a predefined time after the transmission of the AAI_RNG-REQ message.

The BS may receive a MAC message in the allocated uplink bandwidth from the MS.

If the BS fails to receive the MAC message in the allocate uplink bandwidth from the MS, the BS may transmit a NACK signal for the MAC message to the MS and allocate an uplink bandwidth for retransmission of the MAC message to the MS within the predefined time after a time corresponding to the allocated uplink bandwidth.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts.

Through the specification, when it is said that some part "includes" a specific element, this means that the part may further include other elements, not excluding them, unless otherwise mentioned. The term "-er(or)", "module", "portion" or "part" is used to signify a unit of performing at least one function or operation. The unit can be realized in hardware, software, or in combination of both.

A method for network entry according to an exemplary embodiment of the present invention will be described below with reference to FIGS. 4 and 5.

Figure 4:
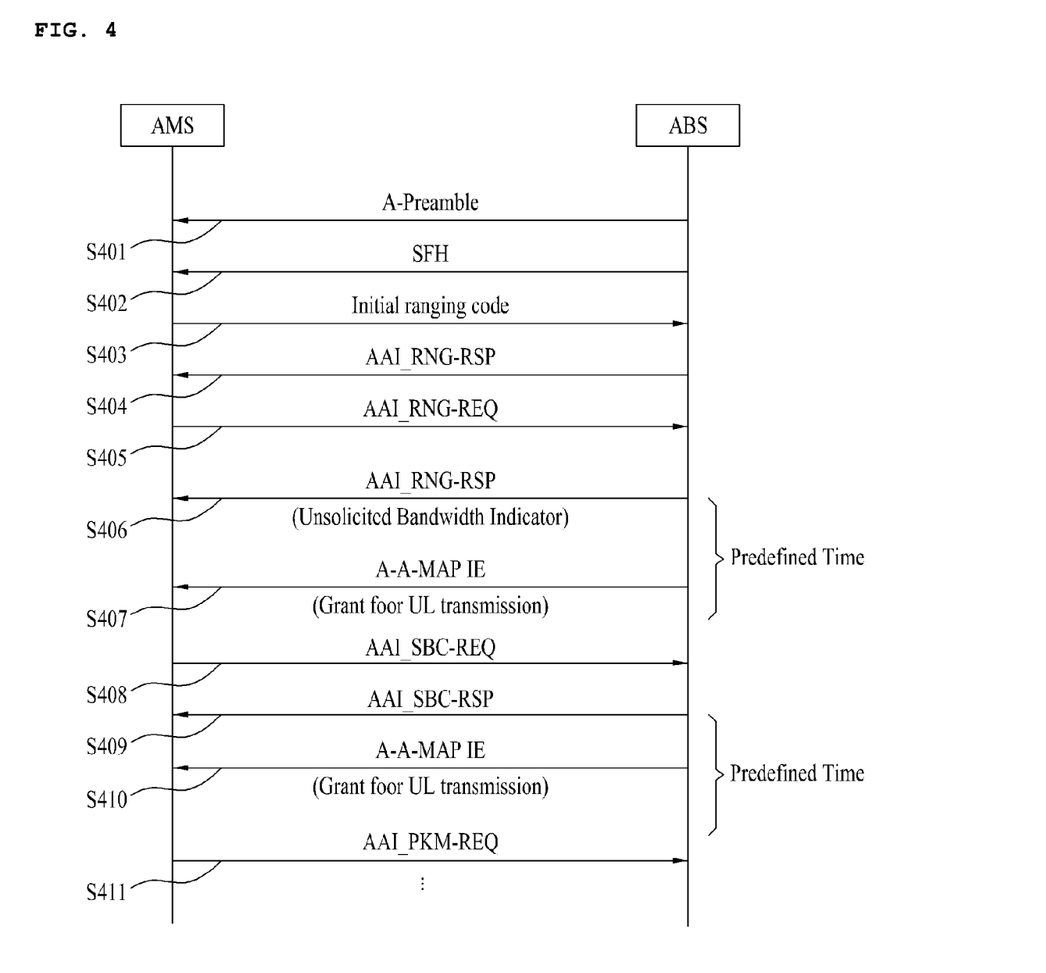
FIG. 4 is a diagram illustrating a signal flow for a network entry method according to an exemplary embodiment of the present invention.
Figure 5:
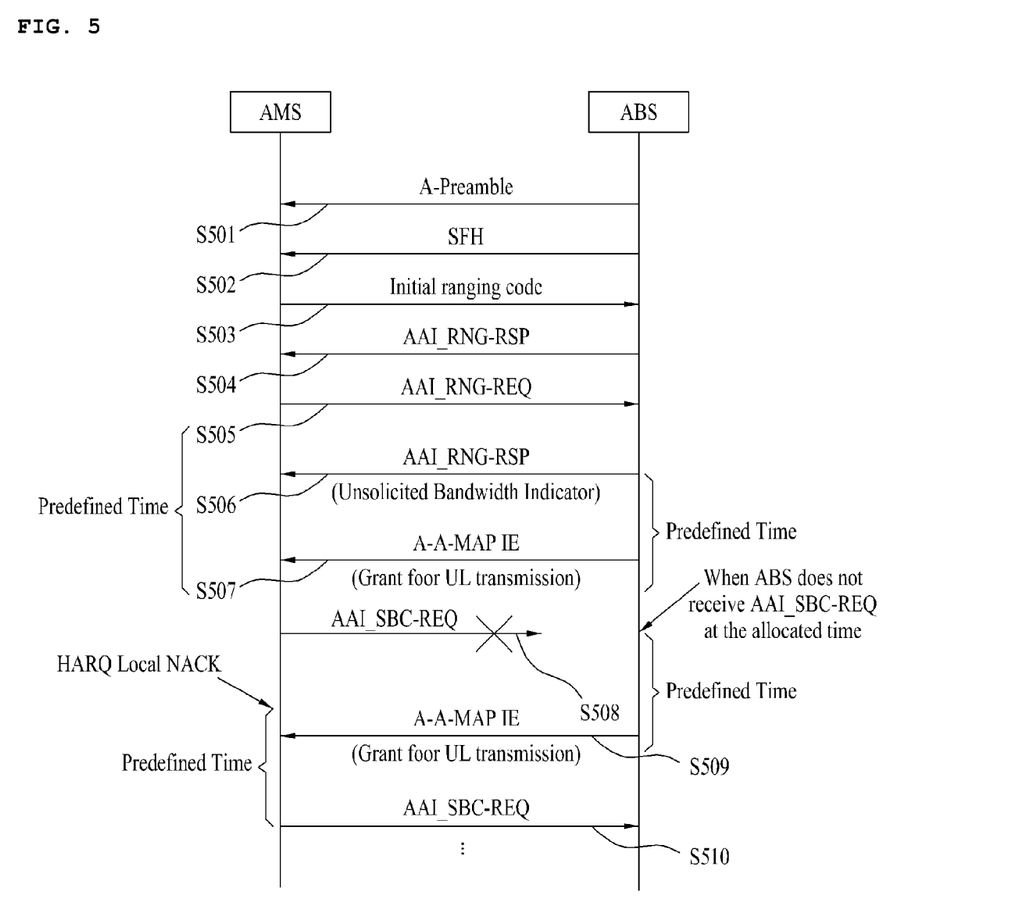
FIG. 5 is a diagram illustrating a signal flow for a network entry method when a Medium Access Control (MAC) message is to be retransmitted according to the exemplary embodiment of the present invention.

FIG. 4 is a diagram illustrating a signal flow for a network entry method according to an exemplary embodiment of the present invention and FIG. 5 is a diagram illustrating a signal flow for a network entry method when a Medium Access Control (MAC) message is to be retransmitted according to the exemplary embodiment of the present invention.

Referring to FIG. 4, an Advanced Mobile Station (AMS) discovers an Advanced Base Station (ABS) and acquires DownLink (DL) synchronization with the ABS by receiving an Advanced Preamble (A-Preamble) from the ABS in step S401 and receives basic parameters in a SuperFrame Header (SFH) from the ABS in step S402. During initial ranging, the MS acquires UL synchronization with the ABS in steps S403 and S404.

In step S405, the AMS transmits an Advanced Air Interface Ranging Request (AAI_RNG-REQ) message to the ABS. The ABS then replies to the AMS with an Advanced Air Interface Ranging Response (AAI_RNG-RSP) message including an unsolicited bandwidth indicator in step S406. The unsolicited bandwidth indicator indicates that the ABS will allocate a UL bandwidth to the AMS for use in transmission of a MAC message, without receiving a Bandwidth Request (BR) from the AMS. In other words, the ABS transmits the unsolicited bandwidth indicator in the AAI_RNG-RSP message to the AMS to indicate that it will allocate a UL bandwidth to the AMS for transmission of a MAC message even though the AMS does not request a bandwidth to the ABS.

Upon receipt of the AAI_RNG-RSP message with the unsolicited bandwidth indicator from the ABS, the AMS monitors an Advanced-MAP Information Element (A-A-MAP IE) for a predefined time period after reception of the AAI_RNG-RSP message, to determine whether the ABS has allocated a UL bandwidth to the AMS. If a UL bandwidth has been allocated to the AMS by the A-A-MAP IE in step S407, the AMS transmits an AAI Subscriber Station Basic Capability Request (AAI_SBC-REQ) message in the allocated UL bandwidth to the ABS in step S408. The ABS then replies to the AMS with an AAI Subscriber Station Basic Capability Response (AAI_SBC-RSP) message in step S409.

For a predefined time after receiving the AAI_SBC-RSP message, the AMS monitors an A-A-MAP IE to thereby determine whether the ABS has allocated a UL bandwidth to the AMS. If the ABS has allocated a UL bandwidth to the AMS by the A-A-MAP IE in step S410, the AMS transmits an AAI Privacy Key Management Request (AAI_PKM-REQ) message in the allocated UL bandwidth to the ABS in step S411.

In this manner, after transmitting a response message to the AMS, the ABS allocates a UL bandwidth for transmission of a next request message to the AMS, until the network entry is completed.

If the AMS fails to receive a UL bandwidth assignment for a predefined time, it performs a contention-based BR procedure. This means that the AMS selects a code from a set of ranging codes classified as BR codes and transmits the selected code to the ABS.

Meanwhile, if an allocated UL bandwidth is not sufficient for transmission of a MAC message, the AMS may piggyback an additional BR along with the MAC message. That is, the AMS may request an additional bandwidth, while transmitting the MAC message.

When the ABS fails to receive a MAC message from the AMS, the AMS retransmits the MAC message. With reference to FIG. 5, a network entry method in case of MAC message retransmission according to the exemplary embodiment of the present invention will be described below.

Referring to FIG. 5, an AMS discovers an ABS and acquires DL synchronization with the ABS by receiving an A-Preamble from the ABS in step S501 and receives basic parameters in an SFH from the ABS in step S502. During initial ranging, the AMS acquires UL synchronization with the ABS in steps S503 and S504.

In step S505, the AMS transmits an AAI_RNG-REQ message to the ABS. The ABS then replies to the AMS with an AAI_RNG-RSP message including an unsolicited bandwidth indicator in step S506.

Upon receipt of the AAI_RNG-RSP message with the unsolicited bandwidth indicator from the ABS, the AMS monitors an A-A-MAP IE for a predefined time after reception of the AAI_RNG-RSP message, to determine whether the ABS has allocated a UL bandwidth to the AMS. If a UL bandwidth has been allocated to the AMS by the A-A-MAP IE in step S507, the AMS transmits an AAI_SBC-REQ message in the allocated UL bandwidth to the ABS in step S508.

If the ABS fails to receive the AAI_SBC-REQ message, it allocates a UL bandwidth for retransmission of the AAI_SBC-REQ message to the AMS within a predefined time period starting from a time corresponding to the UL bandwidth allocated to the AMS for transmission of the AAI_SBC-REQ message in step S509. The AMS monitors an A-A-MAP IE during a predefined time period starting from the time of receiving a Hybrid Automatic Repeat reQuest (HARQ) local Negative ACKnowledgment (NACK) to thereby determine whether the ABS has allocated a UL bandwidth to the AMS. In step S510, if the ABS has allocated a UL bandwidth to the AMS by the A-A-MAP IE, the AMS retransmits the AAI_SBC-REQ message in the allocated UL bandwidth to the ABS.

Figure 6:
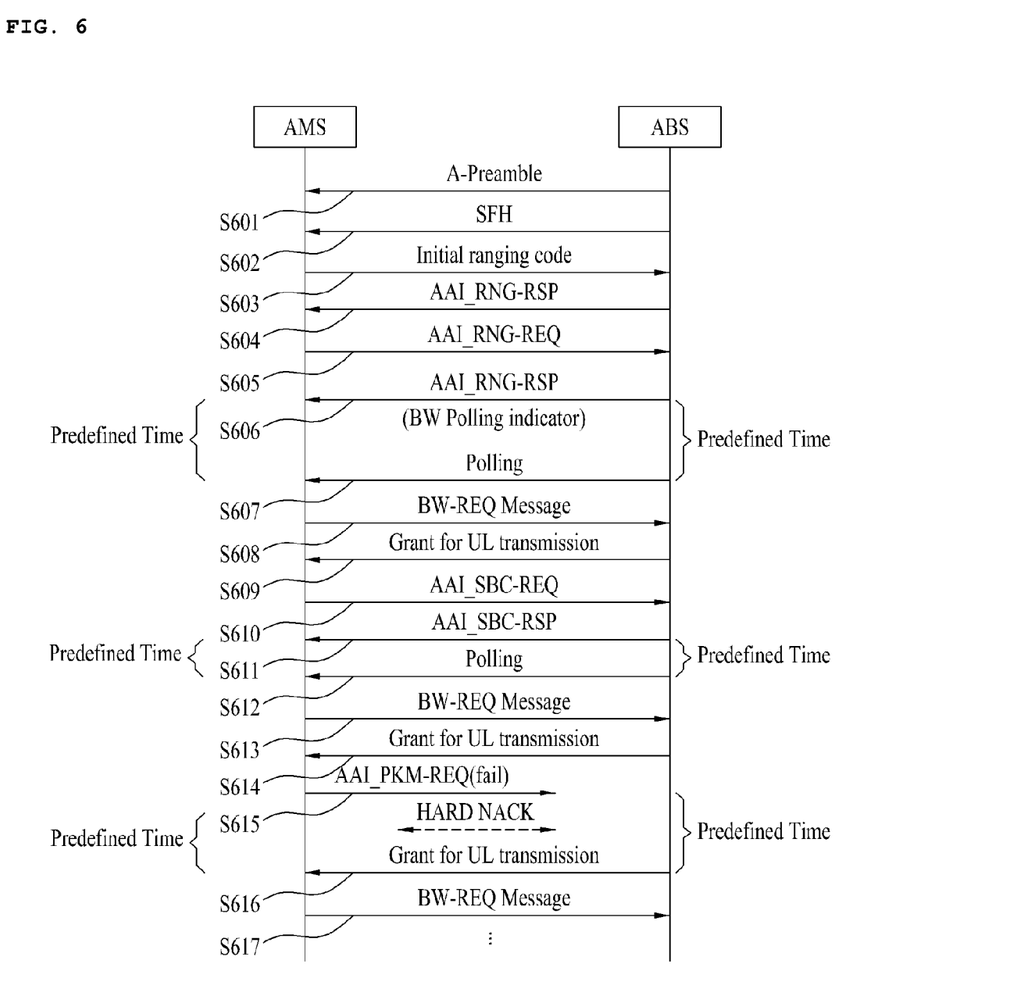
FIG. 6 is a diagram illustrating a signal flow for a network entry method according to another exemplary embodiment of the present invention.

With reference to FIG. 6, a method for network entry according to another exemplary embodiment of the present invention will be described.

MAC messages transmitted by AMSs may have different sizes because the AMSs may exclude different fields from the MAC messages during network entry. Therefore, if an ABS allocates a bandwidth of a predetermined size to the AMSs without solicitation from the AMSs during the network entry, unnecessary bandwidth consumption may result.

Accordingly, the ABS transmits an AAI_RNG-RSP message including a bandwidth polling indicator to an AMS and polls the AMS for a bandwidth for transmission of a BW-REQ message without solicitation from the AMS during network entry. Then the AMS transmits a BW-REQ message including a request size to the ABS.

FIG. 6 is a diagram illustrating a signal flow for a network entry method according to another exemplary embodiment of the present invention.

Referring to FIG. 6, an AMS discovers an ABS and acquires DL synchronization with the ABS by receiving an A-Preamble from the ABS in step S601 and receives basic parameters in an SFH from the ABS in step S602. During initial ranging, the AMS acquires UL synchronization with the ABS in steps S603 and S604.

In step S605, the AMS transmits an AAI_RNG-REQ message to the ABS. The ABS then replies to the AMS with an AAI_RNG-RSP message including a bandwidth polling indicator in step S606.

The bandwidth polling indicator indicates that the ABS will poll the AMS for a UL bandwidth in which the AMS may transmit a BW-REQ message without solicitation from the AMS. That is, the ABS transmits the bandwidth polling indicator in the AAI_RNG-RSP message to the AMS so as to indicate that the ABS will poll the AMS for a UL bandwidth in which for the AMS to transmit a BW-REQ message without solicitation from the AMS during network entry.

Upon receipt of the AAI_RNG-RSP message with the bandwidth polling indicator, the AMS monitors allocation of a UL bandwidth for a predefined time period starting from the reception of the AAI_RNG-RSP message. If the ABS has allocated a UL bandwidth to the AMS in step S607, the AMS transmits a BW-REQ message in the allocated UL bandwidth to the ABS in step S608. The BW-REQ message includes a bandwidth size requested by the AMS. In step S609, the ABS then allocates a bandwidth of the requested size to the AMS.

The AMS transmits an AAI_SBC-REQ message to the ABS in the allocated UL bandwidth in step S610.

The ABS replies to the AMS with an AAI_SBC-RSP message in step S611 and allocates a UL bandwidth to the AMS within a predefined time period after the transmission of the AAI_SBC-RSP message in step S612. In step S613, the AMS transmits a BW-REQ message including a request size to the AMS in the allocated UL bandwidth. The ABS allocates a UL bandwidth of the requested size to the AMS in step S614.

In step S615, the AMS transmits an AAI_PKM-REQ message to the ABS in the allocated UL bandwidth. If the ABS fails to receive the AAI_PKM-REQ message, it allocates a UL bandwidth for retransmission of the AAI_PKM-REQ message to the AMS within a predefined time period starting from a time corresponding to the UL bandwidth allocated to the AMS for transmission of the AAI_PKM-REQ message in step S616. The AMS monitors allocation of a UL bandwidth during a predefined time period starting from the time of receiving an HARQ local NACK. In step S617, if the ABS has allocated a UL bandwidth to the AMS, the AMS retransmits the AAI_PKM-REQ message in the allocated UL bandwidth to the ABS in step S617.

A description will now be made of a method for network entry according to another exemplary embodiment of the present invention with reference to FIG. 7.

In accordance with this exemplary embodiment, an AMS requests allocation of a UL bandwidth for transmission of a next MAC message to an ABS by transmitting a MAC message including an unsolicited bandwidth indicator to the ABS. The AMS may include an unsolicited bandwidth indicator in each MAC message to request UL bandwidth allocation for transmission of the next MAC message. Alternatively or additionally, the AMS may request the ABS to allocate a UL bandwidth for every MAC message used during network entry by transmitting an unsolicited bandwidth indicator in an AAI_RNG-REQ message to the ABS. In this exemplary embodiment, if the ABS fails to receive a MAC message from the AMS until a BR grant timer expires, it allocates a UL bandwidth to the AMS for retransmission of the MAC message without solicitation from the AMS.

Figure 7:
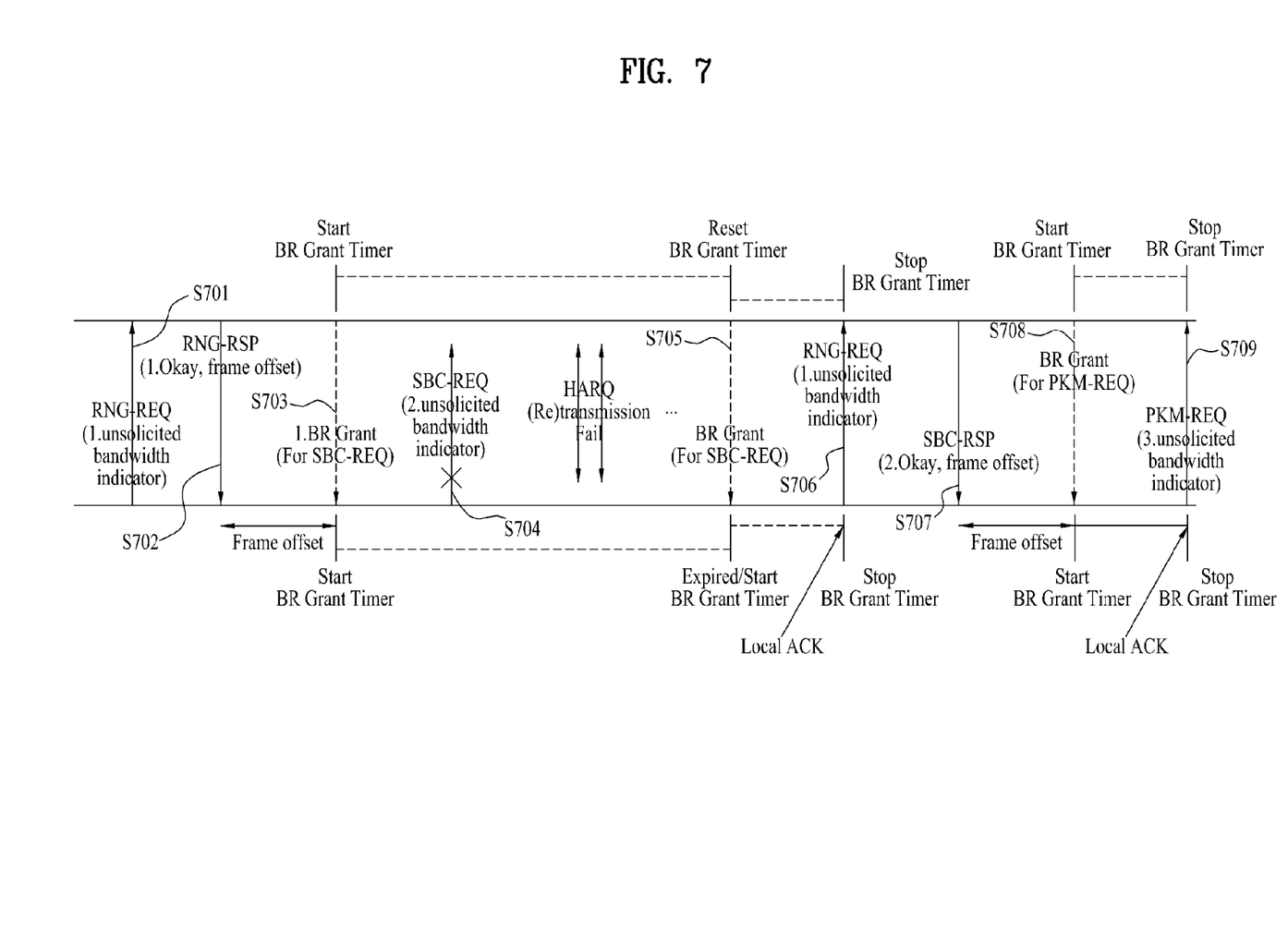
FIG. 7 is a diagram illustrating a signal flow for a network entry method according to another exemplary embodiment of the present invention.

FIG. 7 illustrates a method for network entry according to another exemplary embodiment of the present invention.

Referring to FIG. 7, an AMS transmits an RNG-REQ message including an unsolicited bandwidth indicator to an ABS in step S701. The unsolicited bandwidth indicator is used to request the ABS to allocate a UL bandwidth for transmission of a next MAC message to the AMS without solicitation from the AMS. The AMS may also notify the ABS of the size of the next MAC message along with the unsolicited bandwidth indicator.

In step S702, the ABS transmits an RNG-RSP message including a response for the unsolicited bandwidth indicator and information about a time of allocating a UL bandwidth to the AMS. The response for the unsolicited bandwidth indicator indicates whether the ABS will allocate a UL bandwidth for transmission of an SBC-REQ message to the AMS without solicitation from the AMS and the information about the time of allocating a UL bandwidth may specify a frame offset or subframe offset from the time of the transmission of the RNG-RSP message to the time of allocating a UL bandwidth for transmission of an SBC-REQ message. Instead of notifying the AMS of the time of allocating a UL bandwidth, the allocation time may be preset between the ABS and the AMS such that the ABS allocates a UL bandwidth for transmission of an SBC-REQ message to the AMS within a predefined time period after the transmission of the RNG-RSP message.

In step S703, the ABS allocates a UL bandwidth for transmission of an SBC-REQ message to the AMS until the time corresponding to the frame or subframe offset or within the preset time after the transmission of the RNG-RSP message and activates the BR grant timer. The AMS also activates a BR grant timer when the UL bandwidth for transmission of an SBC-RSP message is allocated.

The AMS transmits an SBC-REQ message in the allocated UL bandwidth to the ABS in step S704. If the ABS fails to receive the SBC-REQ message until the BR grant timer expires, it allocates a UL bandwidth for retransmission of the SBC-REQ message to the AMS and resets the BR grant timer in step S705. When the AMS is aware of the transmission failure of the SBC-REQ message by a NACK until expiration of its BR grant timer, it monitors allocation of a UL bandwidth and retransmits an SBC-REQ message including an unsolicited bandwidth indicator in the allocated UL bandwidth in step S706.

If the ABS successfully receives the SBC-REQ message, it stops the BR grant timer. When it is aware of the successful reception of the SBC-REQ message at the ABS, the AMS also stops its BR grant timer.

Subsequently, the ABS transmits an SBC-RSP message including a response for the unsolicited bandwidth indicator and information about a time of allocating a UL bandwidth to the AMS in step S707, and allocates a UL bandwidth for transmission of a PKM-REQ message to the AMS after a time corresponding to a frame offset from the transmission of the SBC-RSP message and activates the BR grant timer in step S708.

In step S709, the AMS transmits a PKM-REQ message in the allocated UL bandwidth to the ABS.

The BR grant timer may apply during network entry in order to make the network entry fast. Besides, the BR grant timer may be used during requesting a bandwidth for transmission of a message that serves other purposes.

With the use of the BR grant timer, the AMS may retransmit a message in an allocated UL bandwidth immediately upon expiration of the BR grant timer without a need for waiting until expiration of a conventional timer used to receive request and response messages.

In addition, when a transmitter receives an HARQ local NACK message, the use of the BR grant timer enables the transmitter to fast prepare for message retransmission by transmitting an unsolicited bandwidth indicator without waiting until a timer used to confirm message transmission/reception expires.

If an HARQ retransmission timer is defined, the BR grant timer may be replaced with the HARQ retransmission timer. Upon expiration of the HARQ retransmission timer, the ABS may automatically allocate a UL bandwidth for message retransmission to the AMS.

Figure 8:
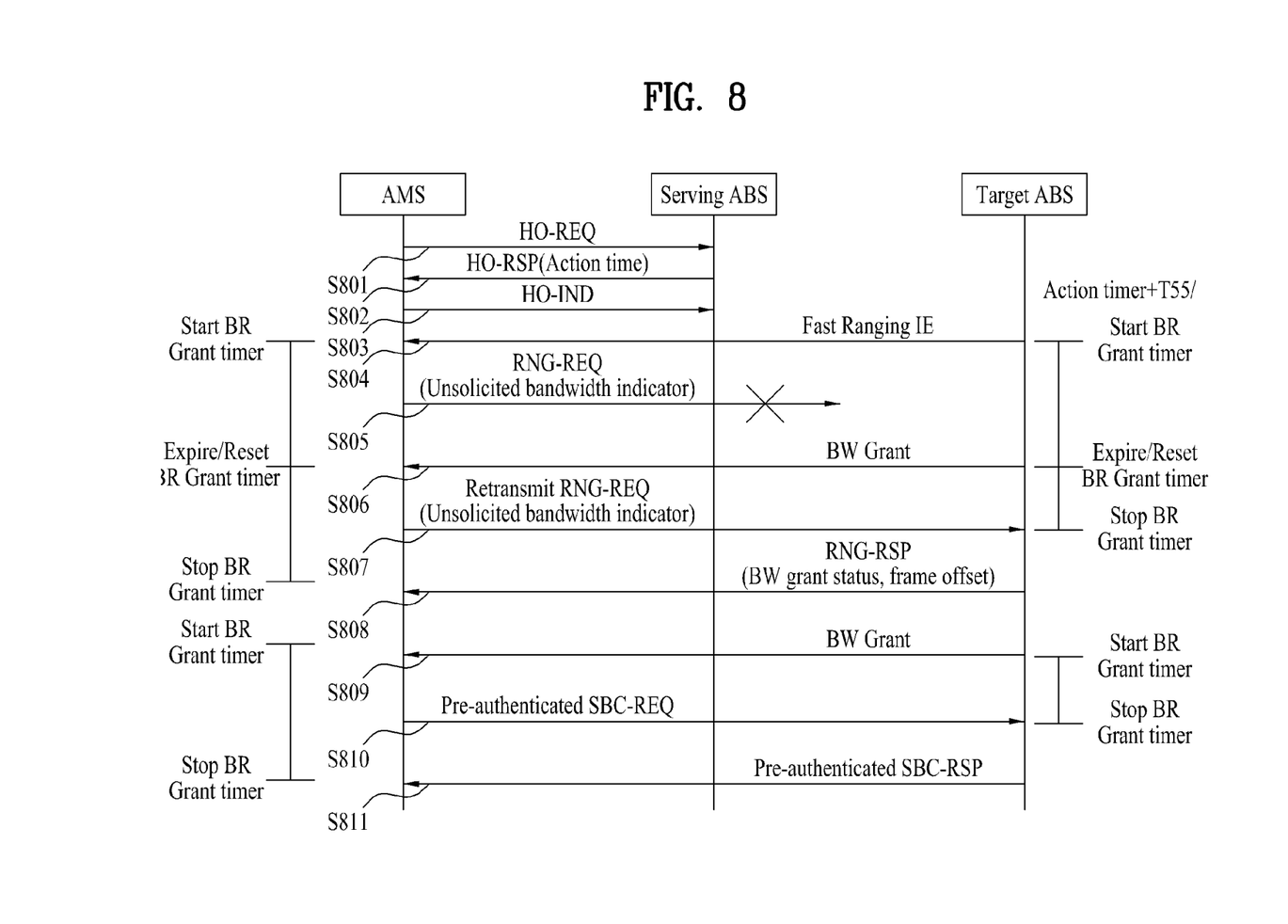
FIG. 8 is a diagram illustrating a signal flow for a network entry method according to a further exemplary embodiment of the present invention.

With reference to FIG. 8, a method for network entry according to a further exemplary embodiment of the present invention will be described.

In accordance with a further exemplary embodiment, an AMS uses an unsolicited bandwidth indicator and a BR grant timer during network reentry after handover.

FIG. 8 is a diagram illustrating a signal flow for a method for network entry according to a further exemplary embodiment of the present invention.

Referring to FIG. 8, an AMS transmits a HandOver Request (HO-REQ) message to a serving ABS in step S801. The serving ABS replies to the AMS with a HandOver Response (HO-RSP) message to the AMS in step S802. The HO-RSP message may include information about an action time, which means that the serving ABS will transmit a fast ranging IE to the AMS after a time corresponding to the action time+a timer value T55. Thus the AMS may get a non-contention-based ranging opportunity to the AMS.

The AMS transmits a HandOver Indication (HO-IND) message to the ABS in step S803. When receiving the fast ranging IE from the ABS in step S804, the AMS activates a BW grant timer. The ABS also activates a BR grant timer after transmitting the fast ranging IE. In step S805, the AMS transmits an RNG-REQ message in an allocated UL bandwidth to the ABS. The RNG-REQ message includes an unsolicited bandwidth indicator.

If the ABS fails to receive the RNG-REQ message until expiration of the BR grant timer, the ABS allocates a UL bandwidth for retransmission of the RNG-REQ message to the AMS in step S806. Then the AMS retransmits the RNG-REQ message to the ABS in the allocated UL bandwidth in step S807.

Upon successful reception of the RNG-REQ message, the ABS transmits an RNG-RSP message including a response for the unsolicited bandwidth indicator and information about a time of allocating a UL bandwidth to the AMS in step S808.

The ABS allocates a UL bandwidth for transmission of an SBC-REQ message to the AMS and activates the BR grant timer in step S809. Upon receipt of the SBC-REQ message from the AMS, the ABS stops the BR grant timer in step S810 and replies to the AMS with an SBC-RSP message in step S811.

As is apparent from the above description, without solicitation from an MS, a BS allocates a UL bandwidth to the MS so that the MS will transmit a MAC message in the allocated UL bandwidth according to exemplary embodiments of the present invention. Therefore, the MS's network entry is not delayed.

The exemplary embodiments of the present invention may be achieved by various means, for example, hardware, firmware, software, or a combination thereof. In a hardware configuration, the methods for transmitting control information in a wireless communication system according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods for updating a location in a wireless communication system according to the embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

It is obvious to those skilled in the art that claims that are not explicitly cited in each other in the appended claims may be presented in combination as an exemplary embodiment of the present invention or included as a new claim by a subsequent amendment after the application is filed.

What is claimed is:

1. A method of performing a network entry at a mobile station (MS) in a wireless communication system, the method comprising:
   receiving, by the MS, an Advanced Air Interface Ranging Response (AAI-RNG-RSP) message from a base station (BS),
   wherein the AAI-RNG-RSP message includes an unsolicited bandwidth grant indicator, and
   wherein the unsolicited bandwidth grant indicator indicates that the BS will allocate a bandwidth to the MS within a predefined time and without receiving a bandwidth request from the MS during the network entry;
   after receiving the AAI-RNG-RSP message, monitoring, by the MS, an Advanced MAP Information Element (A-MAP IE) during the predefined time for a bandwidth allocation and without performing the bandwidth request; and
   transmitting a piggyback bandwidth request to the BS when an allocated bandwidth is not sufficient for transmission of a medium access control (MAC) message.

2. The method according to claim 1, further comprising:
   identifying the allocated bandwidth within the predefined time according to the AAI-RNG-RSP message after the reception of the AAI-RNG-RSP message.

3. The method according to claim 1, further comprising:
   performing a contention based bandwidth request if the MS fails to identify the allocated bandwidth within the predefined time.

4. The method according to claim 1, wherein the predefined time is a bandwidth request grant time duration.

5. A method for supporting a network entry at a base station (BS) in a wireless communication system, the method comprising:
   transmitting, by the BS, an Advanced Air Interface Ranging Response (AAI-RNG-RSP) message to a mobile station (MS),
   wherein the AAI-RNG-RSP includes an unsolicited bandwidth grant indicator, and
   wherein the unsolicited bandwidth grant indicator indicates that the BS will allocate a bandwidth within a predetermined time to the MS and without receiving a bandwidth request from the MS during the network entry;
   after the transmitting the AAI-RNG-RSP message, allocating, by the BS, the bandwidth to the MS within the predefined time and without receiving the bandwidth request from the MS; and
   receiving a piggyback bandwidth request from the MS when the allocated bandwidth is not sufficient for transmission of a medium access control (MAC) message.

6. The method according to claim 5, wherein the predefined time is a bandwidth request grant time duration.

7. A mobile station (MS) of performing a network entry in a wireless communication system, the MS comprising:
   a transmitter;
   a receiver; and
   a processor operatively connected to the receiver and the transmitter and configured to:
   receive an Advanced Air Interface Ranging Response (AAI-RNG-RSP) message from a base station (BS),
   wherein the AAI-RNG-RSP message includes an unsolicited bandwidth grant indicator, and
   wherein the unsolicited bandwidth grant indicator indicates that the BS will allocate a bandwidth to the MS within a predefined time and without receiving a bandwidth request from the MS during the network entry, after the reception of the AAI-RNG-RSP message, monitor an Advanced MAP Information Element (A-MAP IE) during the predefined time for a bandwidth allocation without performing the bandwidth request, and transmit a piggyback bandwidth request to the BS when an allocated bandwidth is not sufficient for transmission of a medium access control (MAC) message.

8. A base station (BS) for supporting a network entry in a wireless communication system, the BS comprising:

a receiver;

a transmitter; and a processor operatively connected to the transmitter and the receiver and configured to:

transmit an Advanced Air Interface Ranging Response (AAI-RNG-RSP) message to a mobile station (MS), wherein the AAI-RNG-RSP message includes an unsolicited bandwidth grant indicator, and wherein the unsolicited bandwidth grant indicator indicates that the BS will allocate a bandwidth to the MS within a predetermined time and without receiving a bandwidth request from the MS during the network entry, after the transmission of the AAI-RNG-RSP message, allocate a bandwidth to the MS within the predefined time without receiving the bandwidth request from the MS, and receive a piggyback bandwidth request from the MS when the allocated bandwidth is not sufficient for transmission of a medium access control (MAC) message.

\* \* \* \* \*